United States Patent
Takiguchi

(10) Patent No.: US 9,215,339 B2
(45) Date of Patent: Dec. 15, 2015

(54) DATA PROCESSING APPARATUS, DATA PROCESSING METHOD, AND IMAGE PROCESSING APPARATUS

(71) Applicant: Oki Data Corporation, Tokyo (JP)

(72) Inventor: Mitsuru Takiguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/499,500

(22) Filed: Sep. 29, 2014

(65) Prior Publication Data
US 2015/0092214 A1  Apr. 2, 2015

(30) Foreign Application Priority Data
Sep. 30, 2013 (JP) .................................. 2013-204276

(51) Int. Cl.
*H04N 1/00* (2006.01)
(52) U.S. Cl.
CPC ....... *H04N 1/00411* (2013.01); *H04N 1/00384* (2013.01); *H04N 1/00392* (2013.01); *H04N 2201/0094* (2013.01)
(58) Field of Classification Search
CPC .......... H04N 1/00411; H04N 1/00384; H04N 1/00392; H04N 2201/0094
USPC ......................................................... 358/1.13
See application file for complete search history.

(56) References Cited

U.S. PATENT DOCUMENTS

| | | | | |
|---|---|---|---|---|
| 2006/0129912 | A1* | 6/2006 | Kunori | 715/501.1 |
| 2008/0320390 | A1* | 12/2008 | Semple et al. | 715/700 |
| 2014/0372933 | A1* | 12/2014 | Shirolkar et al. | 715/780 |

FOREIGN PATENT DOCUMENTS

JP  2008-074023 A  4/2008

* cited by examiner

*Primary Examiner* — Iriana Cruz
(74) *Attorney, Agent, or Firm* — Marvin A. Motsenbocker; MOTS Law, PLLC

(57) ABSTRACT

A data processing apparatus includes a hard key, a display, and a display control unit that displays on the display a soft key and an entry field. The display control unit displays a hard key image or a hard key acceptability image in the entry field, when an input with the hard key to the entry field and an input with the soft key to the entry field are both allowed. But the display control unit does not display the hard key image or the hard key acceptability image in the entry field, when the soft key input to the entry field is allowed and the hard key input to the entry field is not allowed.

19 Claims, 13 Drawing Sheets

DATA PROCESSING APPARATUS, DATA PROCESSING METHOD, AND IMAGE PROCESSING APPARATUS

CROSS REFERENCE TO RELATED APPLICATIONS

This application claims priority based on 35 USC 119 from prior Japanese Patent Application No. 2013-204276 filed on Sep. 30, 2013, entitled "DATA PROCESSING APPARATUS, DATA PROCESSING METHOD, AND IMAGE PROCESSING APPARATUS", the entire contents of which are incorporated herein by reference.

BACKGROUND OF THE INVENTION

1. Field of the Invention

This disclosure relates to a data processing apparatus, a data processing method, and an image processing apparatus, which are applicable to an operation screen of an MFP (multifunction peripheral), for example.

2. Description of Related Art

Conventional MFPs and the like usually include an operation panel, on a front face of the apparatus, as a user interface for receiving data inputs related to various operations, telephone numbers, and so forth.

Meanwhile, such operation panels for MFPs include one that accepts both inputs of characters using soft keys displayed on an operation screen and inputs of characters using hard keys such as a numerical keypad.

Patent Document 1 (Japanese Patent Application Publication No. 2008-74023) discloses an example of a related art which enables character inputs using both soft keys and hard keys.

SUMMARY OF THE INVENTION

Meanwhile, processing that requests inputs using an operation screen (with soft keys), which is easier to modify as compared to hard keys that are hard to modify, is increasing nowadays along with advancements in functionality of MFPs. Nonetheless, a user accustomed to operating hard keys may be perplexed at inputs using the soft keys (the operation screen).

For this reason, there is a demand for a data processing apparatus, a data processing method, and an image processing apparatus, which are capable of helping a user to input characters when receiving the character input from the user by using an input device (such as an operation panel of an MFP) provided with soft keys and hard keys.

A first aspect of the invention is a data processing apparatus that comprises: a hard key; a display; and a display control unit that displays on the display a soft key and an entry field. The display control unit displays a hard key image or a hard key acceptability image in the entry field when an input with the hard key to the entry field and an input with the soft key to the entry field are both allowed, but does not display the hard key image or the hard key acceptability image in the entry field when the soft key input to the entry field is allowed and the hard key input to the entry field is not allowed.

A second aspect of the invention is a data processing apparatus that comprises: an operation screen processor configured to display an operation screen on a screen of a display output device; a hard key input unit capable of receiving a character input using a hard key; a character input object processor configured to display a character input object on the screen of the display output device, the character input object allowing an input of a character string therein; a soft key processor configured to display a soft key on the screen of the display output device, and capable of receiving a character input in the character input object; and a hard key acceptability image display unit configured, when the character input object displayed by the character input object processor can accept at least an input using the hard key, to display a hard key acceptability image in a display area for characters to be inputted within the character input object, the hard key acceptability image indicating that the character input object accepts the input using the hard key.

A third aspect of the invention is a data processing method used in a data processing apparatus provided with an operation screen processor configured to display an operation screen on a screen of a display output device, and a hard key input unit capable of receiving a character input using a hard key. The method comprises: displaying a character input object on the screen of the display output device, the character input object allowing an input of a character string therein; displaying a soft key on the screen of the display output device and receiving a character input in the character input object; and displaying, when the character input object displayed by a character input object processor can accept at least an input using the hard key, a hard key acceptability image in a display area for characters to be inputted within the character input object, the hard key acceptability image indicating that the character input object accepts the input using the hard key.

A fourth aspect of the invention is an image formation apparatus that comprises the data processing apparatus according to the first aspect.

According to the above-described aspects, the aspects can help a user to input characters when receiving the character inputs from the user by using an input device provided with soft keys and hard keys.

DETAILED DESCRIPTION OF EMBODIMENTS

Figure 1:
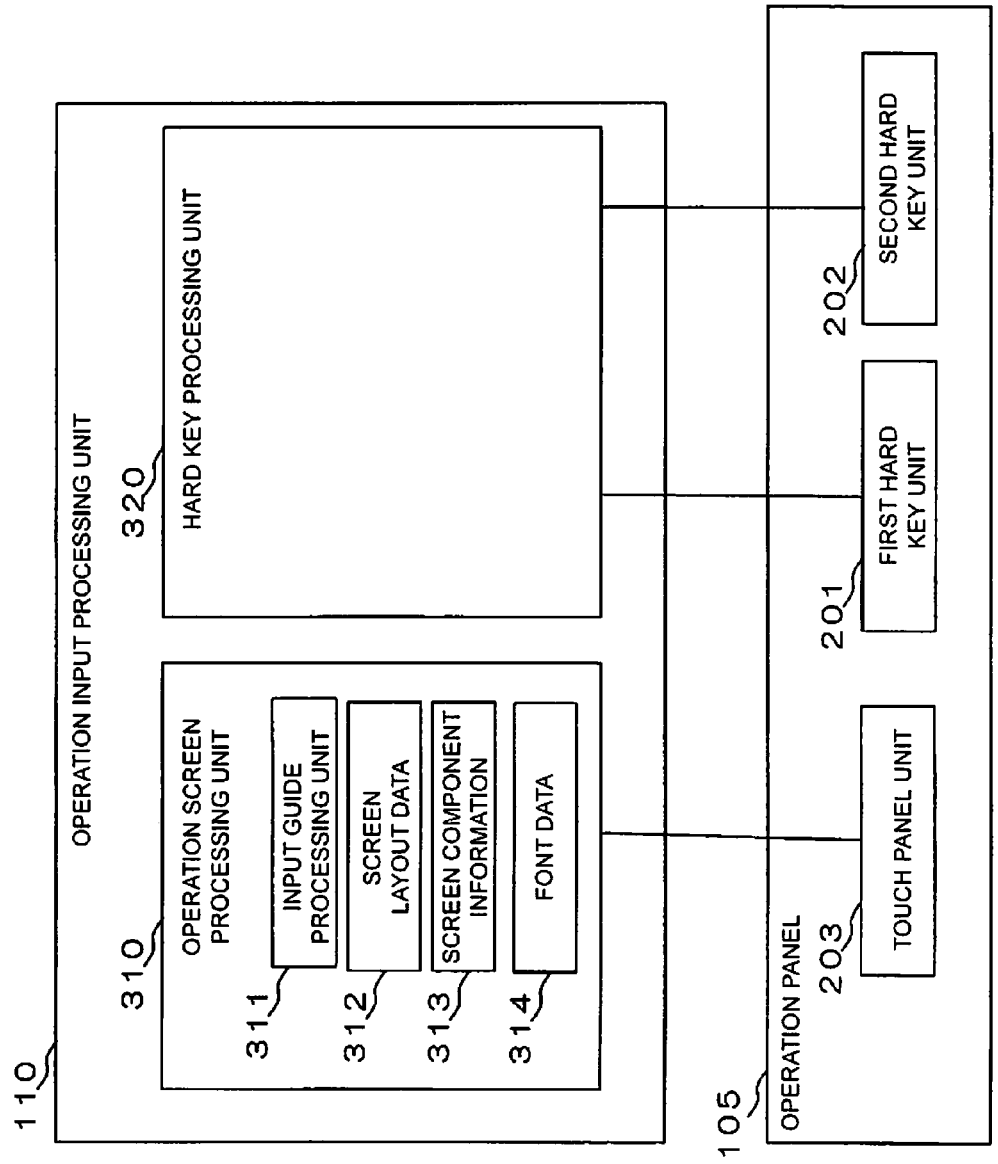
FIG. 1 is a block diagram illustrating a functional configuration of an operation input processing unit of an MFP according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

(A) First Embodiment

A data processing apparatus, a data processing method, and an image processing apparatus according to a first embodiment of the invention are described below in detail with reference to the drawings. Descriptions are provided hereinbelow for an example of an application of an image processing apparatus in which a data processing apparatus of the invention is mounted to an MFP.

(A-1) Configuration of First Embodiment

Figure 2:
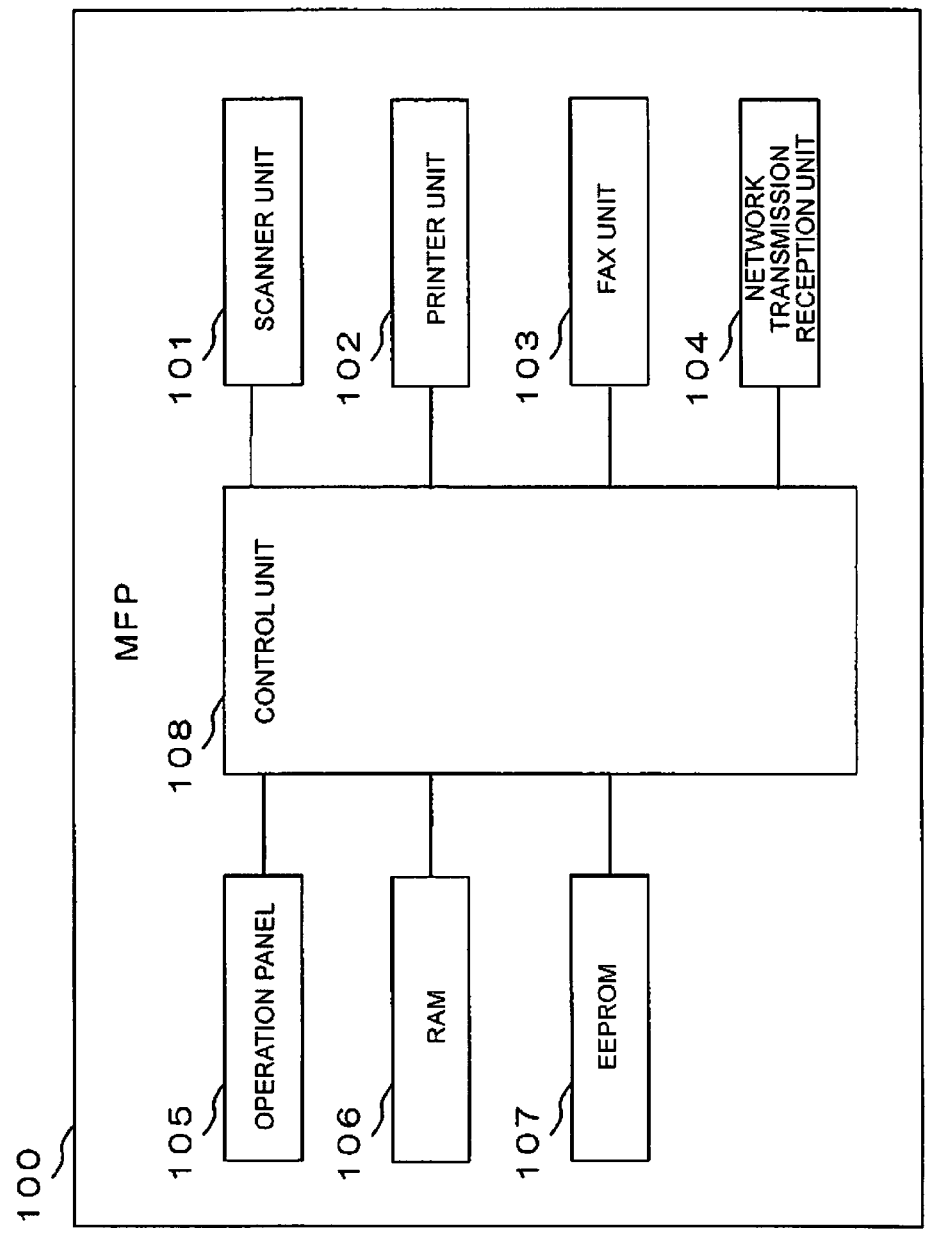
FIG. 2 is a block diagram illustrating a hardware configuration of the MFP according to the first embodiment.

FIG. 2 is an explanatory diagram illustrating a hardware configuration of MFP 100 of the embodiment. MFP 100 of the embodiment includes scanner unit 101, printer unit 102 as an image formation processing unit, FAX unit 103, network transmission reception unit 104, operation panel 105, RAM 106, EEPROM 107, and control unit 108.

Scanner unit 101 reads an original document using a flat bed or an automatic document feeder, creates image data from the read original document, and supplies the image data to control unit 108 (image data processing unit 109 (FIG. 3)).

Regarding image data supplied from scanner unit 101 or network transmission reception unit 104, printer unit 102 is configured to receive the supply of the image data via control unit 108 (image data processing unit 109) and to perform processing for making a print (forming an image) on a print sheet (a medium) on the basis of the image data.

For example, regarding the image data supplied from scanner unit 101 via control unit 108 (image data processing unit 109), printer unit 102 performs processing ("COPY function" processing) for converting the image data into print data and making the print on the basis of the print data. Meanwhile, regarding print job data received by network transmission reception unit 104, printer unit 102 receives the supply of the print job data via control unit 108 (image data processing unit 109) and performs print processing. Specifically, printer unit 102 performs processing ("PRINT function" processing) for creating print image data on the basis of the supplied print job data and making the print on the print sheet on the basis of the print image data.

FAX unit 103 is connected to a telephone line (a FAX line) and handles a "FAX function" in MFP 100. For example, regarding image data created by scanner unit 101, FAX unit 103 receives the supply of the image data via control unit 108 (image data processing unit 109), and performs processing ("FAX function" processing) for converting the image data into FAX-transmittable FAX data (a FAX transmission signal) and transmitting the FAX data by FAX to the outside (a telephone communication network) via the telephone line.

Operation panel 105 functions as a user interface in MFP 100. Specifically, operation panel 105 of the embodiment outputs information to a user and receives inputs from the user by using a touch panel display and hard keys. A specific configuration of operation panel 105 is described later.

Figure 3:
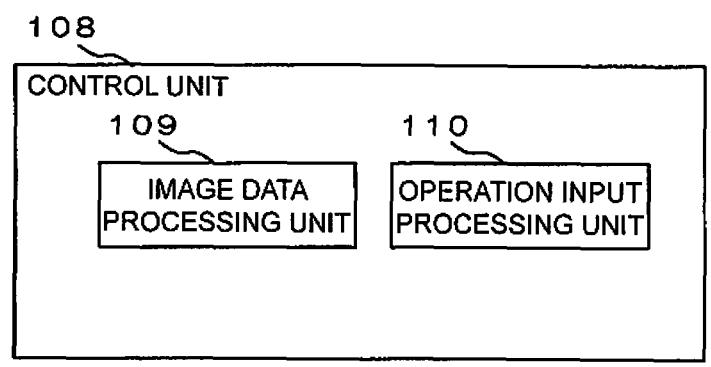
FIG. 3 is a block diagram illustrating a functional configuration (a software configuration) of a control unit of the MFP according to the first embodiment.

FIG. 3 is a block diagram illustrating a functional configuration (a software configuration) of control unit 108.

Control unit 108 is configured to control actions of the constituents of MFP 100, and includes image data processing unit 109 and operation input processing unit 110. Control unit 108 can be constructed, for example, by causing a computer equipped with a processor and the like to execute a program (a program at least designed to achieve functions of image data processing unit 109 and operation input processing unit 110).

Meanwhile, the data processing apparatus of the embodiment may be formed from image data processing unit 109 and operation input processing unit 110. In other words, the data processing apparatus of the embodiment may be realized by installing the above-described data processing program on the computer.

Image data processing unit 109 is configured to execute a variety of image processing concerning the functions of MFP 100. For example, image data processing unit 109 processes data supplied from scanner unit 101, FAX unit 103, network transmission reception unit 104, and the like in response to an operation by a user, and supplies the processed data to another constituent. Image data processing unit 109 processes the supplied data in response to an operation by the user, and outputs the contents corresponding to the operation by the user.

Operation input processing unit 110 is configured to perform data processing and the like concerning the user interface. Details of operation input processing unit 110 are described later.

RAM 106 is a memory region (a primary memory region) for temporarily storing the data at the time of processing for each of the functions. Meanwhile, EEPROM 107 is a non-volatile memory which stores programs and the like for causing setting information on the apparatus to be executed by parameters and control unit 108.

Network transmission reception unit 104 handles a function as a network interface to connect MFP 100 to a network (such as a LAN). When the print job data is supplied to network transmission reception unit 104 by way of communication from a host apparatus such as a PC, for instance, network transmission reception unit 104 supplies the print job data to printer unit 102 via control unit 108 (image data processing unit 109). Meanwhile, when the image data created by scanner unit 101 is supplied to network transmission reception unit 104 via control unit 108 (image data processing unit 109), for instance, network transmission reception unit 104 performs processing ("SCAN function" processing) for transmitting an email, with the image data as an attachment to it, to a destination address in response to an operation by the user. In addition, network transmission reception unit 104 performs processing for uploading the image data created by scanner unit 101, for example, to a server (such as a predetermined folder in a file server or the like) on the network to be connected.

Next, a configuration example of operation panel 105 is described with reference to FIG. 4.

Figure 4:
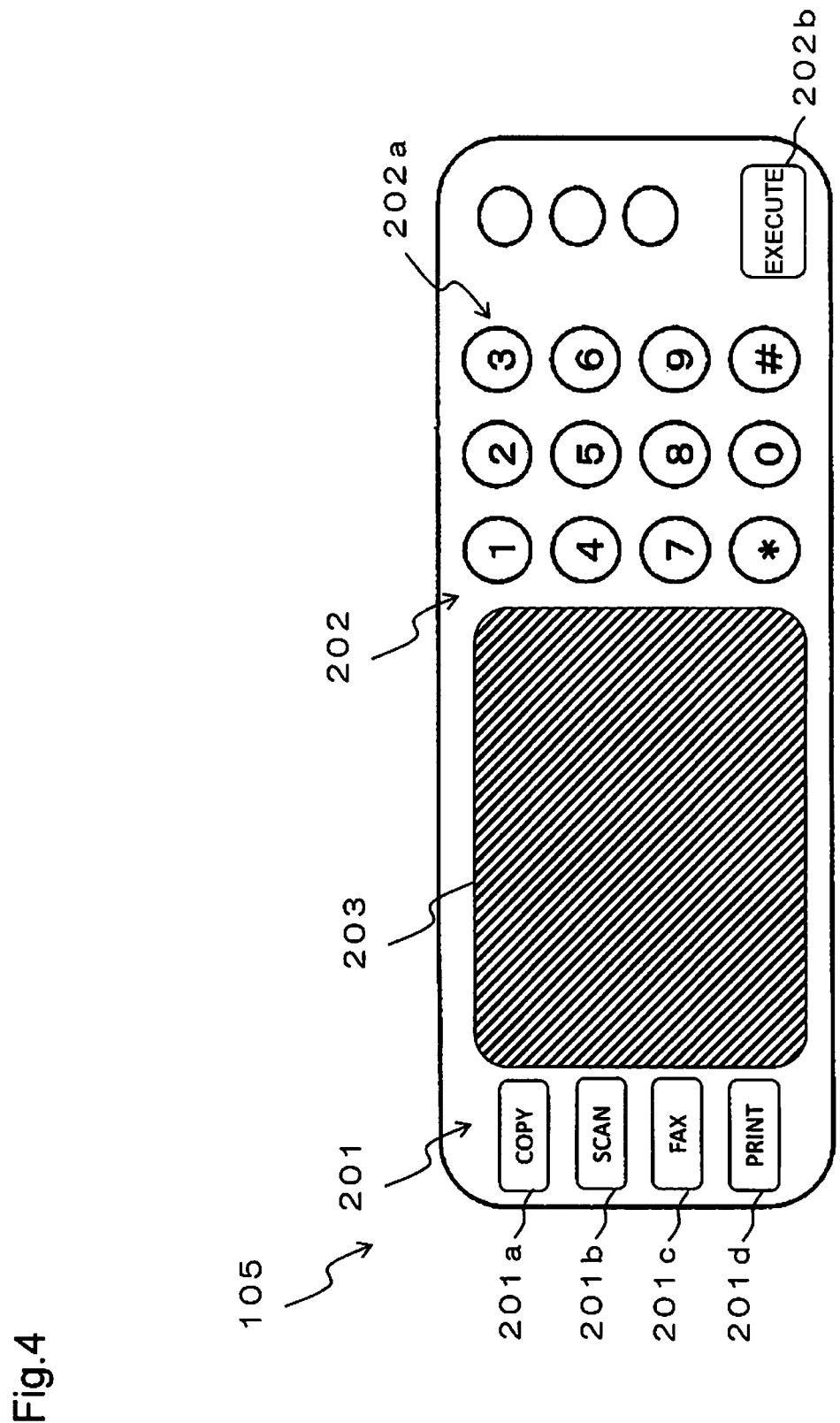
FIG. 4 is an explanatory view illustrating a configuration example of an operation panel mounted on the MFP according to the first embodiment.

FIG. 4 is a plan view of operation panel 105.

It is assumed that operation panel 105 of the embodiment is broadly divided into first hard key unit 201, second hardware keyboard unit 202, and touch panel unit 203.

Touch panel unit 203 is a device capable of displaying operation screens corresponding to the control by control unit 108 on a LCD, and receiving an operation by the user (such as a push of a soft key on an operation screen). Touch panel unit 203 supplies an operation signal (such as information on a touched region), which is based on the operation by the user, to control unit 108 (operation input processing unit 110).

First hard key unit 201 and second hard key unit 202 each include multiple hard keys. Control unit 108 (operation input processing unit 110) receives the supply of operation signals corresponding to the pushes of those keys.

Keys (function keys) corresponding to the respective functions handled by MFP 100 are arranged in first hard key unit 201. In MFP 100, when any of the function keys constituting first hard key unit 201 is pushed, an operation screen on touch panel unit 203 transitions to a screen for receiving an operation to execute the relevant function.

COPY function key 201a, SCAN function key 201b, FAX function key 201c, and PRINT function key 201d corresponding to the COPY function, the SCAN function, the FAX function, and the PRINT function, respectively, are arranged in first hard key unit 201.

At least numerical keypad 202a (keys for inputting numerals) and execute key 202b mainly for executing the functions are arranged in second hard key unit 202.

In MFP 100, scanner unit 101, printer unit 102, FAX unit 103, network transmission reception unit 104, and the like function as an image processor.

Next, details of operation input processing unit 110 are described.

Operation input processing unit 110 is configured to perform control concerning operation panel 105, and to process the operation signals based on the operations with operation panel 105. Operation input processing unit 110 includes operation screen processing unit 310 and hard key processing unit 320. In other words, operation input processing unit 110 performs, among other things, processing for converting the operations inputted from operation panel 105 into commands for executing the corresponding functions of MFP 100.

Hard key processing unit 320 is configured to detect the pushes of the hard keys (in first hard key unit 201 and second hard key unit 202).

Operation screen processing unit 310 is configured to perform a display of the operation screens on touch panel unit 203, detection of the operation signals with the operation screens (detection of the touched keys), and the like. Operation screen processing unit 310 has input guide processing unit 311, screen layout data 312, screen component information 313, and font data 314.

Operation screen processing unit 310 performs control processing, which is to switch the operation screens to be displayed on touch panel unit 203, to hold the input data inputted by the user, and so forth. Operation screen processing unit 310 uses resource data in screen layout data 312, screen component information 313, and font data 314 to be described later in order to create the operation screens.

Screen layout data 312 represents information on positions within a screen to be displayed on touch panel unit 203, which involves information as to where screen components need to be located in a screen, and the like.

Screen component information 313 represents information defining attributes (behaviors, colors, gradations, and the like) of the screen components (such as text boxes and buttons) used in the screen to be displayed on touch panel unit 203.

Font data 314 represents data of character fonts used in the screen to be displayed on touch panel unit 203.

Input guide processing unit 311 is configured to assist the user input on the screen to be displayed on touch panel unit 203. Details of input guide processing unit 311 are described later.

As described above, in MFP 100, operation screen processing unit 310 and touch panel unit 203 collectively constitute a character input object processor, a soft key processor, and an operation screen processor. Moreover, in MFP 100, input guide processing unit 311 constitutes a hard key acceptability image display unit. Furthermore, in MFP 100, hard key processing unit 320 and the hard keys (in first hard key unit 201 and second hard key unit 202) collectively constitute a hard key input unit.

(A-2) Actions of First Embodiment

Next, actions of MFP 100 of the first embodiment provided with the above-mentioned configuration are described.

First, an action of control unit 108 (and its operation input processing unit 110) in MFP 100 to request the user to input a character string by using only the soft keys is described with reference to FIGS. 5 and 6. Here, MFP 100 is assumed to receive inputs of character strings of alphanumeric characters and the like by using only the soft keys when MFP 100 receives inputs of an email address, a subject title, a body text, and so forth. Note that a window used for receiving inputs from the user (regardless of what the contents of the inputs are) is hereinafter referred to as an "input window" or a "character input object." Moreover, constituents such as the input windows to be arranged on the operation screens are hereinafter generically referred to as objects when appropriate.

Figure 5:
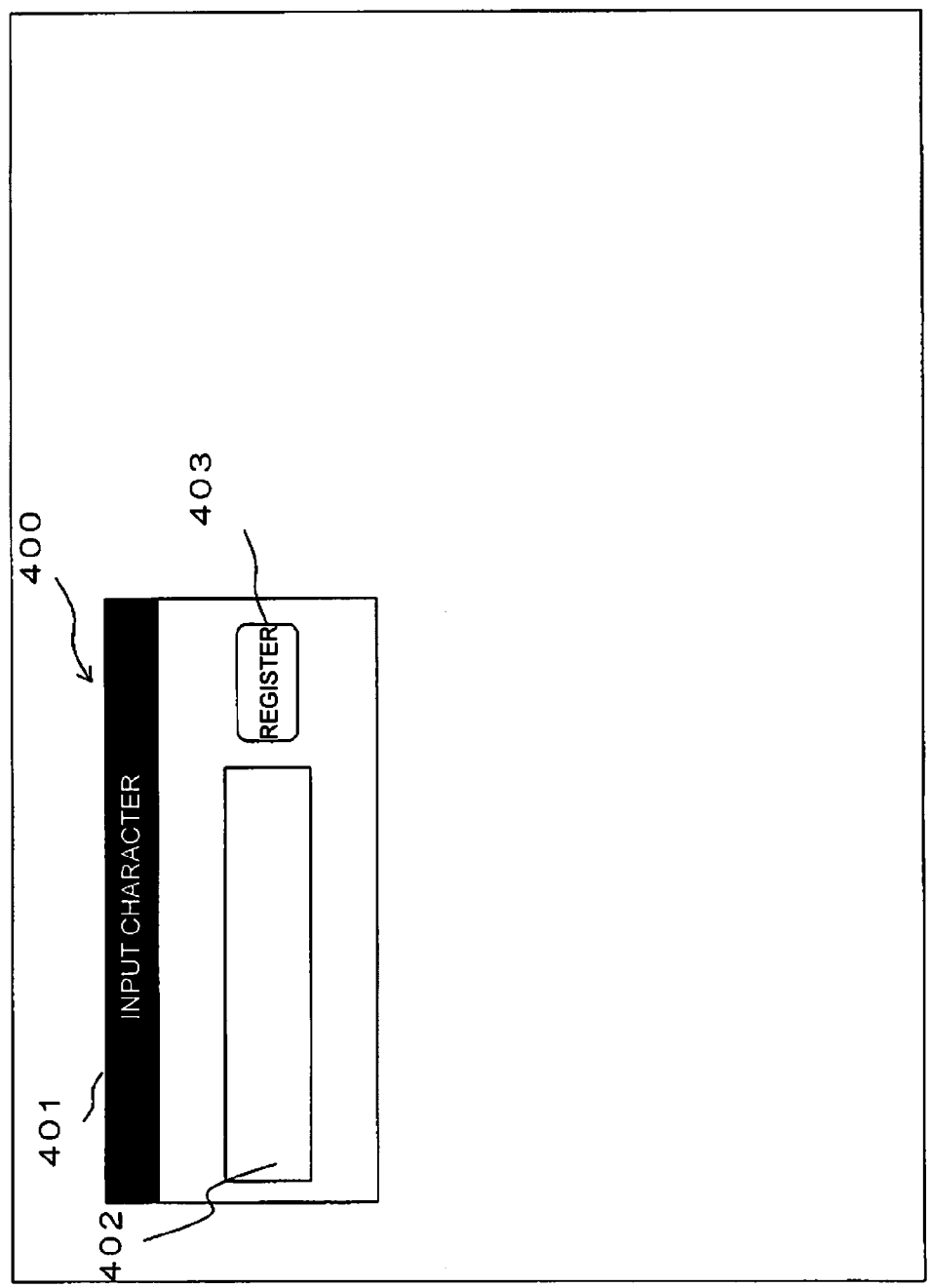
FIG. 5 is an explanatory view illustrating a first operation screen to be displayed on the MFP of the first embodiment.
Figure 6:
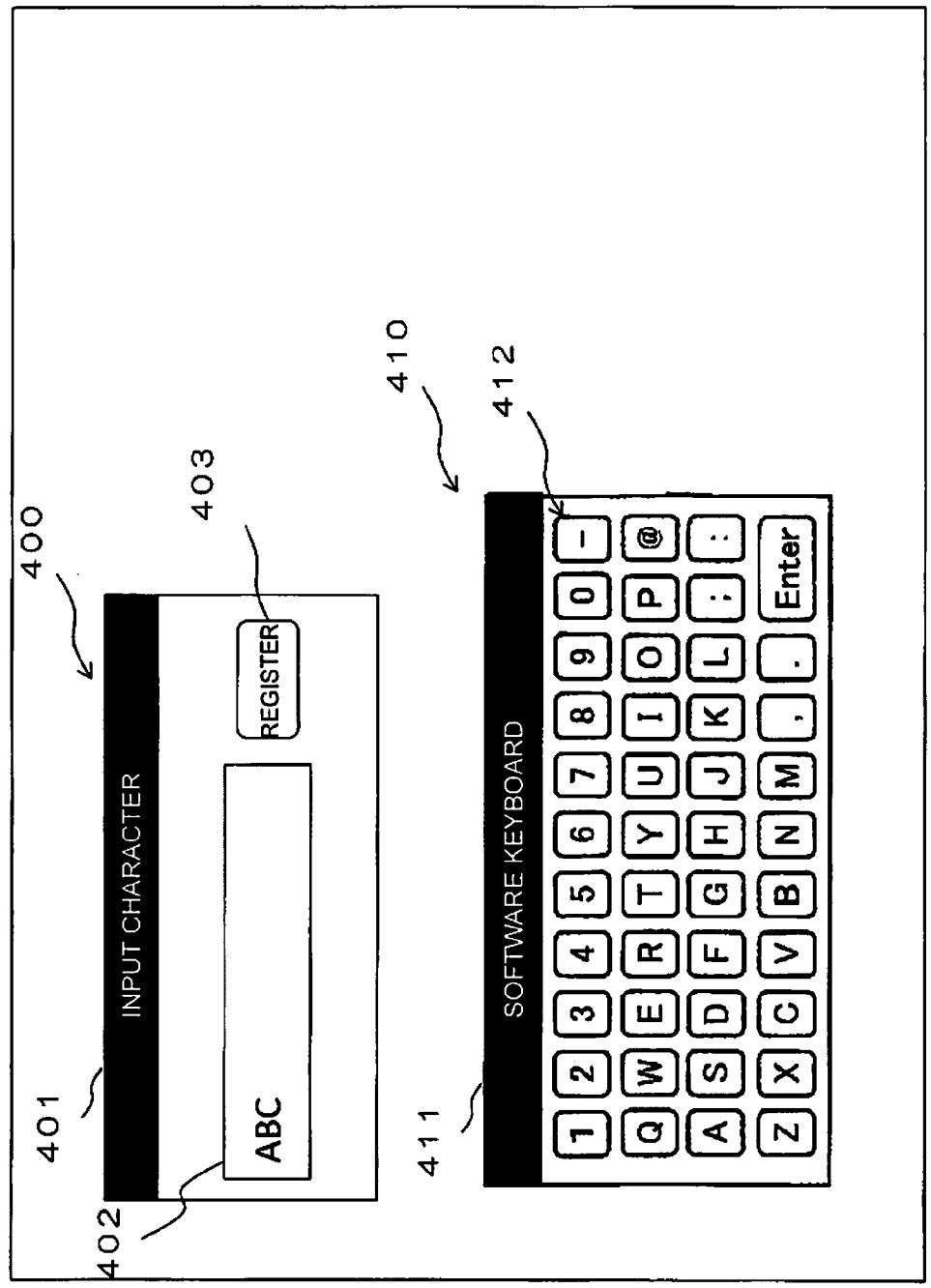
FIG. 6 is an explanatory view illustrating a second operation screen to be displayed on the MFP of the first embodiment.

FIG. 5 illustrates a state in which a pop-up window (hereinafter referred to as "character input window 400") for receiving a character input is displayed on a screen of touch panel unit 203.

Title bar 401, text box 402 or an entry field, and button 403 are arranged in character input window 400. Information on each of the components constituting character input window 400 is stored in screen component information 313 (FIG. 1). In the meantime, data on the character fonts to be displayed on title bar 401 and button 403 are stored in font data 314. Furthermore, identification information on the components used in character input window 400 and positional information on the components (hereinafter referred to as "layout data" when appropriate) is stored in screen layout data 312. Regarding other windows to be displayed by operation screen processing unit 310, the order of the processing is the same while the acquired data are different. In this context, detailed descriptions on the other windows are omitted herein.

In order to display character input window 400 on touch panel unit 203, operation screen processing unit 310 reads the layout data corresponding to character input window 400 from screen layout data 312, then acquires the component information based on the read layout data from screen component information 313 and arranges the components, and displays a set character image (a character image acquired from font data 314) in such a way as to superpose the set character image on the displayed components when appropriate.

Thereafter, when text box 402 is touched in the state where character input window 400 is displayed on the screen of touch panel unit 203, operation input processing unit 110 additionally displays a soft keyboard pop-up window (hereinafter referred to as "soft keyboard window 410") on the screen of touch panel unit 203. The state of the display on the screen of touch panel unit 203 in this case is illustrated in FIG. 6.

Title bar 411 and soft keyboard 412, in which the soft keys corresponding to the alphanumeric characters are arranged in the QWERTY style, are arranged in soft keyboard window 410. Operation screen processing unit 310 displays the characters, which correspond to the pushed keys on soft keyboard 412 in soft keyboard window 410, on text box 402 in character input window 400. Meanwhile, when button 403 (a register button) in character input window 400 is pushed, operation screen processing unit 310 closes the input reception with the contents displayed on text box 402.

Next, an action of control unit 108 (operation input processing unit 110) in MFP 100 requesting the user to input a character string by at least using the hard keys is described with reference to FIGS. 7 and 8. Specifically, MFP 100 is assumed to allow an input of characters (a character input) using not only the soft keys (the software keyboard) but also the hard keys (numerical keypad 202a) when receiving a number input such as a FAX number.

Figure 7:
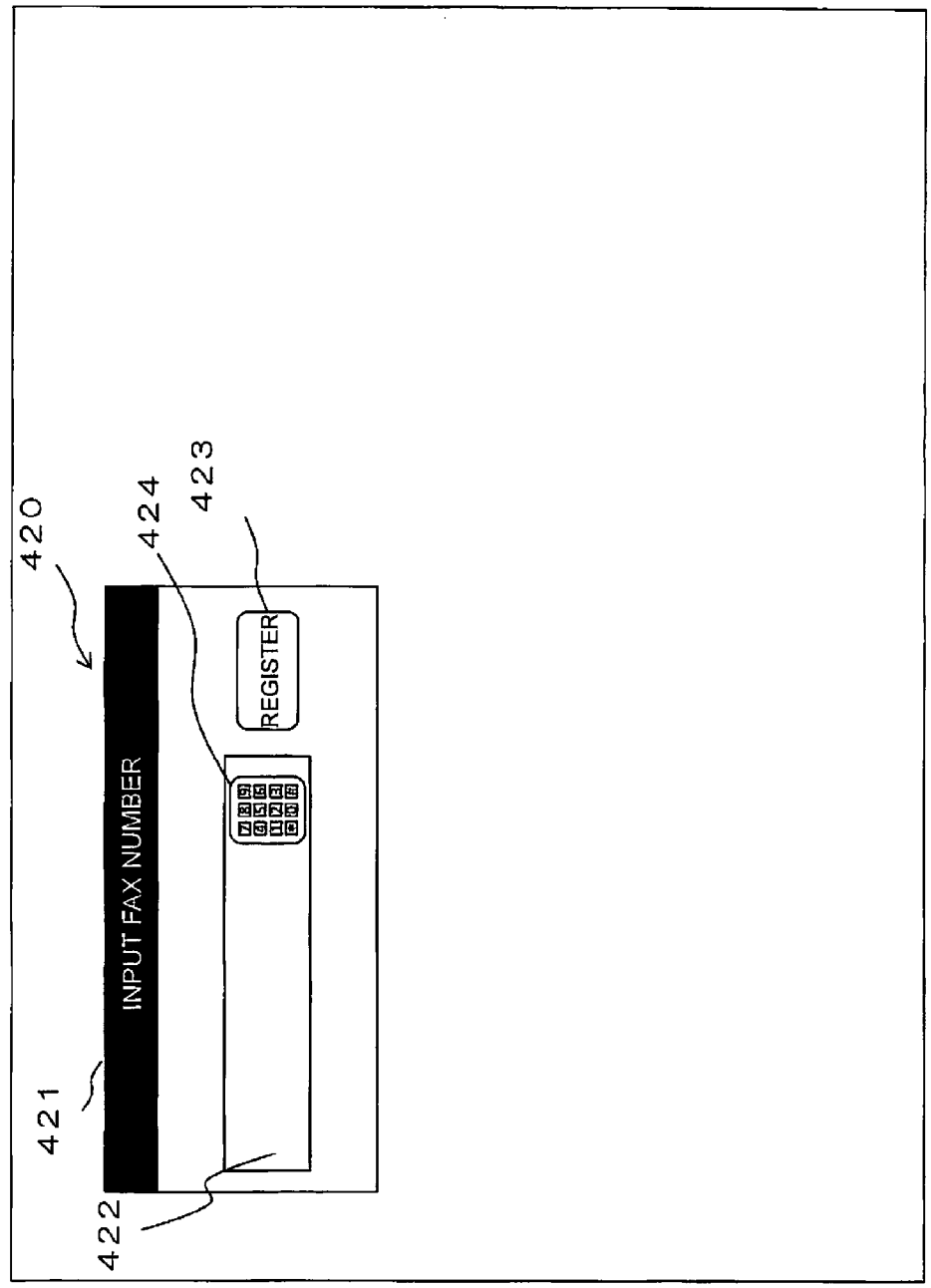
FIG. 7 is an explanatory view illustrating a third operation screen to be displayed on the MFP of the first embodiment.
Figure 8:
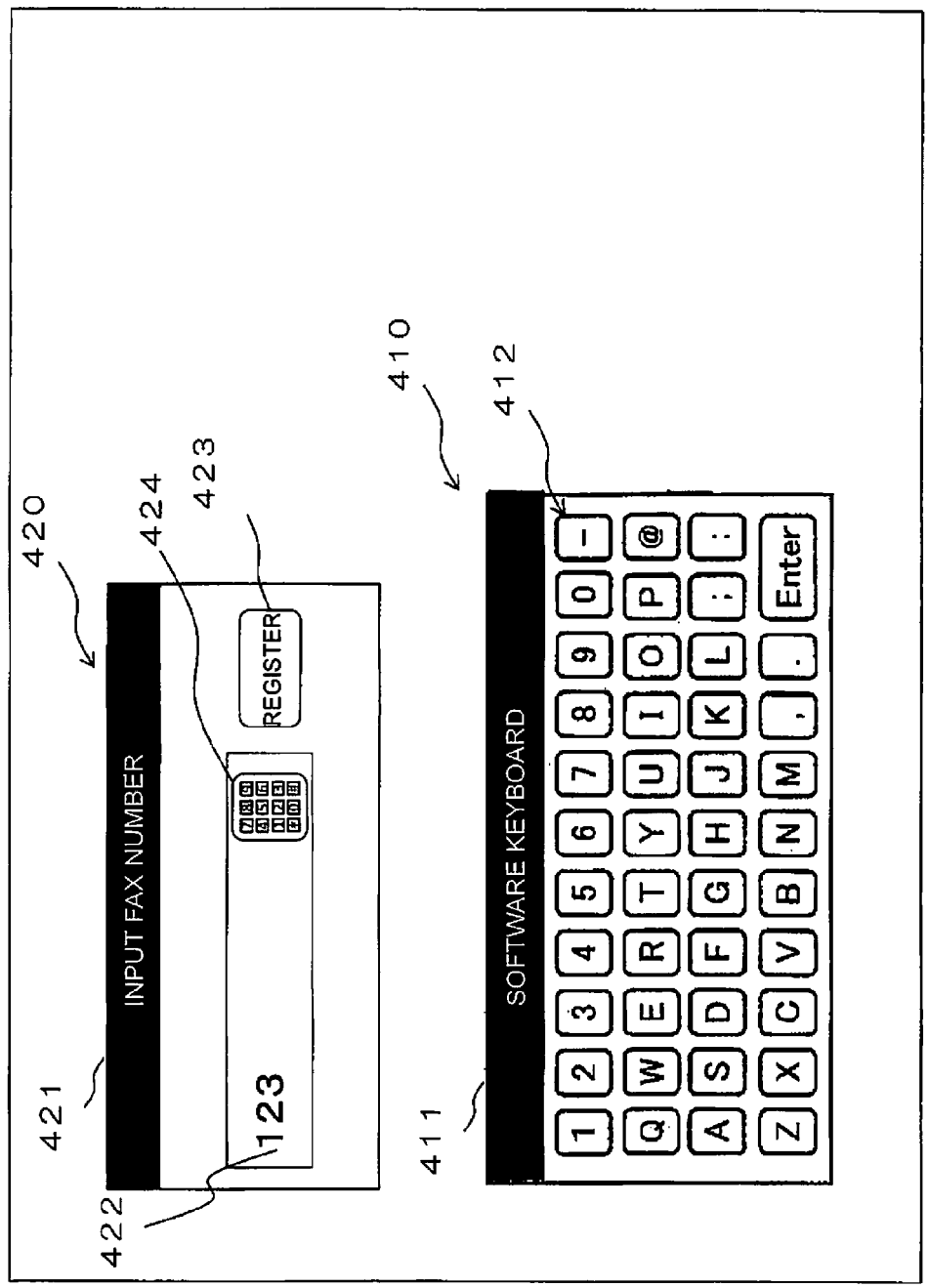
FIG. 8 is an explanatory view illustrating a fourth operation screen to be displayed on the MFP of the first embodiment.

FIG. 7 illustrates a state in which a pop-up window (hereinafter referred to as "FAX number input window 420") for receiving a FAX number is displayed on the screen of touch panel unit 203.

Title bar 421, text box 422, and button 423 are arranged in FAX number input window 420. Moreover, image 424 of an icon (hereinafter referred to as an "operation key icon" or a "hard key acceptability image") for causing the user to recognize that an input using the hard keys is also receivable is additionally arranged in FAX number input window 420. Details of operation key icon 424 are described later.

Thereafter, when text box 422 is touched in the state where FAX number input window 420 is displayed on the screen of touch panel unit 203, operation input processing unit 110 additionally displays soft keyboard window 410 on the screen of touch panel unit 203. The state of display on the screen of touch panel unit 203 in this case is illustrated in FIG. 8.

Operation screen processing unit 310 (input guide processing unit 311) is assumed to be able to receive both the input using the soft keys (soft keyboard window 410) and the input using the hard keys (numerical keypad 202a) in the case of the input window such as FAX number input window 420 which allows the input using the hard keys (numerical keypad 202a) as well. Here, operation screen processing unit 310 displays operation key icon 424 inside text box 422 as a predetermined image for causing the user to recognize the state in which the input using the hard keys (numerical keypad 202a) is also receivable as described above. In other words, in MFP 100, the input window displaying operation key icon 424 inside the text box is assumed to indicate the state in which the input using the hard keys (numerical keypad 202a) is also receivable.

Figure 9:
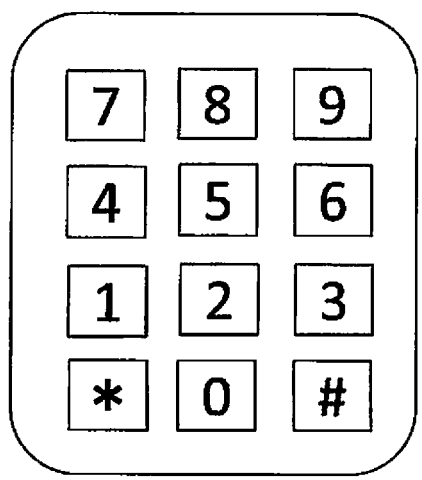
FIG. 9 is an explanatory view illustrating a configuration example of an operation key icon to be displayed on the MFP of the first embodiment.

A specific image configuration of operation key icon 424 is not limited. Nonetheless, an image of a symbol representing a numerical keypad may be used as illustrated in FIG. 9.

Figure 10:
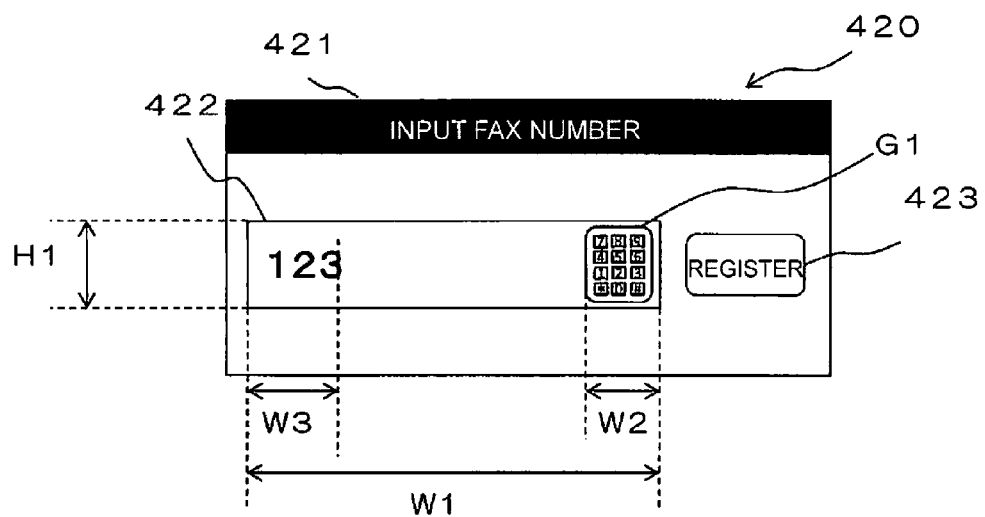
FIG. 10 is an explanatory view illustrating a configuration example of a FAX number input window to be displayed on the MFP according to the first embodiment.

In any of the input windows, operation key icon 424 therein is an object used for assisting the input (supporting the input) by the user. Here, operation key icon 424 is described as being subject to display control by input guide processing unit 311. Input guide processing unit 311 may store operation key icons in multiple sizes in advance, and select the operation key icon in the optimum size corresponding to the size of each text box. As illustrated in FIG. 10, for example, input guide processing unit 311 may be configured to select the operation key icon in the optimum size in accordance with a height H1 and width W1 of a text box, and to display the selected operation key icon in the text box. For example, operation screen processing unit 310 may be configured to select and display the operation key icon in the largest size which can be displayed on the text box.

Figure 11:
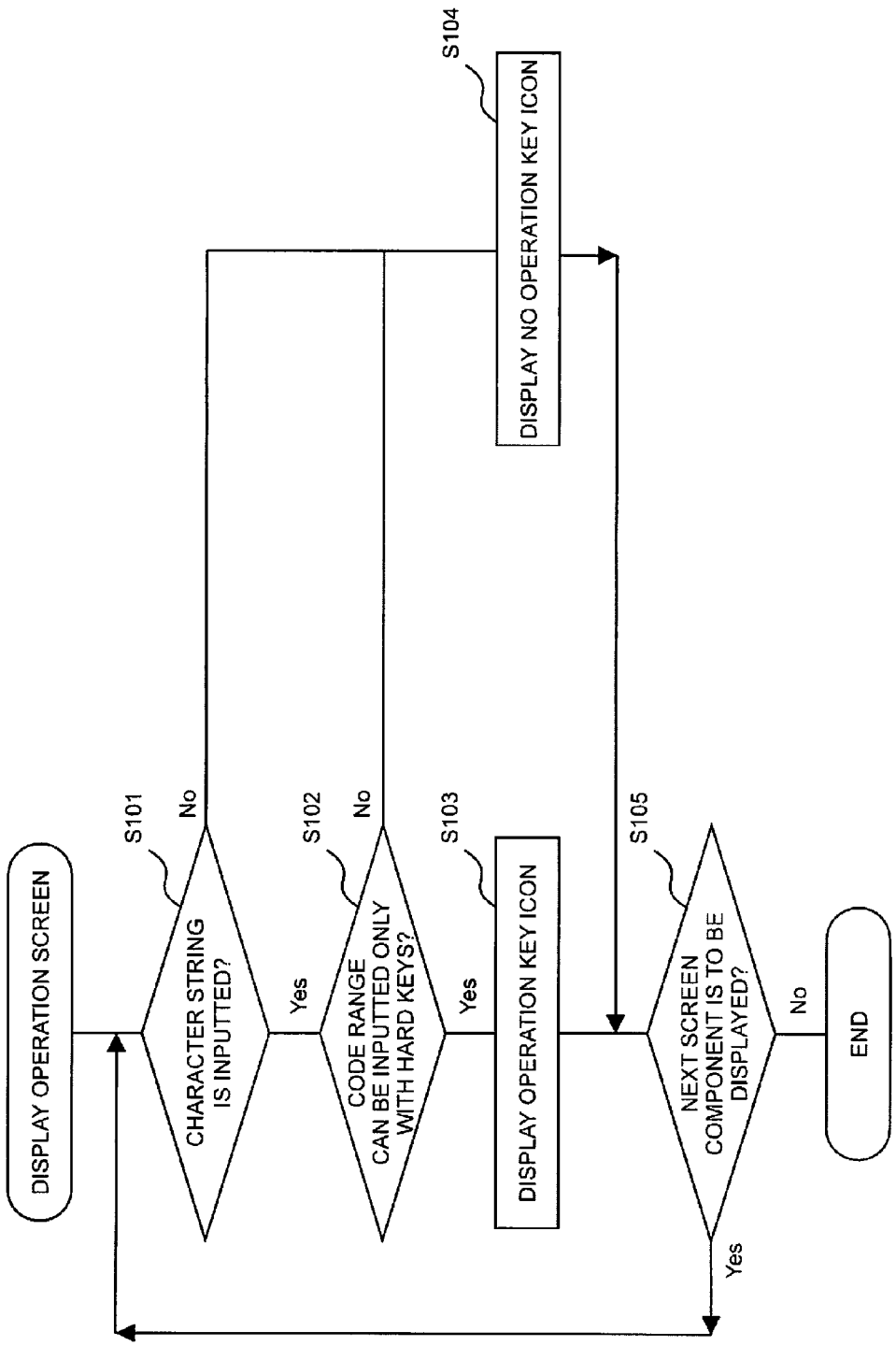
FIG. 11 is a flowchart illustrating actions of an input guide processing unit of the MFP according to the first embodiment.

Next, the processing for touch panel unit 203 by input guide processing unit 311 is described by using the flowchart of FIG. 11. FIG. 11 illustrates the processing by input guide processing unit 311 when operation screen processing unit 310 starts the display of the input window.

At the start of the display of the input window, input guide processing unit 311 starts the processing for displaying the components one by one based on the layout data.

First, input guide processing unit 311 assumes that operation screen processing unit 310 displays one component (an object) constituting the input window. Then, input guide processing unit 311 determines whether or not the component is a component concerning the character input (an object such as a text box) (S101). When the component is the component concerning the character input, input guide processing unit 311 performs actions starting from step S102 to be described later. If not, input guide processing unit 311 performs actions starting from step S104 to be described later.

When the component is determined to be the component concerning the character input in step S101 described above, input guide processing unit 311 determines whether or not a range of the character input (a range of character codes) represented by the component can be inputted only with the hard keys (the numerical keypad 202a) (S102). For example, when the range of the input codes consists of numerals (0 to 9), input guide processing unit 311 determines that the range of the character input can be inputted only with the hard keys (numeral keypad 202a). When the range of the input codes requires the input of characters other than the numerals (i.e., alphabets), input guide processing unit 311 determines that the range of the character input cannot be inputted only with the hard keys (numerical keypad 202a).

When the component concerning the character input is determined to be the component that can be inputted only with the hard keys (numerical keypad 202a) in step S102 described above, input guide processing unit 311 acquires data on operation key icon 424 that is optimal for an input area of the input window for the character input (an area of the text box), and displays operation key icon 424 inside the input area (S103).

On the other hand, when the component is not determined to be the component concerning the character input in step S101 described above, input guide processing unit 311 determines not to display operation key icon 424 (S104).

After the processing in steps S103 and S104, input guide processing unit 311 determines whether or not operation screen processing unit 310 executes a display of the next component (S105). When the next component is to be displayed, input guide processing unit 311 performs the actions starting from step S101 described above. If not, input guide processing unit 311 terminates the processing.

(A-3) Effect of First Embodiment

The first embodiment can achieve the following effect.

In MFP 100, as illustrated in FIGS. 5 to 8, regarding the object (such as the FAX number input window) in which the characters can be inputted by using the hard keys (numerical keypad 202a), it is possible to cause the user to recognize that the input using the hard keys (numerical keypad 202a) is receivable by displaying operation key icon 424, which indicates that the input using the hard keys is receivable, inside the area for displaying the inputted characters (such as inside of the text box). Thus, the user can easily recognize the object among the input windows displayed by the MFP 100, which receives the input using the hard keys (numerical keypad 202a). Hence, the MFP 100 can improve its convenience.

(B) Second Embodiment

A data processing apparatus, a data processing method, and an image processing apparatus according to a second embodiment of the invention are described below in detail with reference to the drawings. Descriptions are provided hereinbelow for an example of an application of the image processing apparatus in which the data processing apparatus of the invention is mounted to an MFP.

(B-1) Configuration of Second Embodiment

A configuration of MFP 100 of the second embodiment can also be explained by using FIGS. 1 to 4 described above.

In the following, the difference between the second embodiment and the first embodiment is described.

The second embodiment is different from the first embodiment in that input guide processing unit 311 is configured to perform processing for displaying operation key icon G1 once in a text box, and then erasing displayed operation key icon G1 in accordance with a length (a width) of a character string inputted in the text box.

(B-2) Actions of Second Embodiment

Next, actions of MFP 100 of the second embodiment provided with the above-mentioned configuration are described.

In the following, only different features of MFP 100 of the second embodiment from those of first embodiment are described.

As described above, the processing by input guide processing unit 311 in the second embodiment is different from that in the first embodiment. Accordingly, only the actions of input guide processing unit 311 are described.

First, an outline of the actions of input guide processing unit 311 of the second embodiment is described with reference to FIGS. 12A and 12B.

Figure 12A:
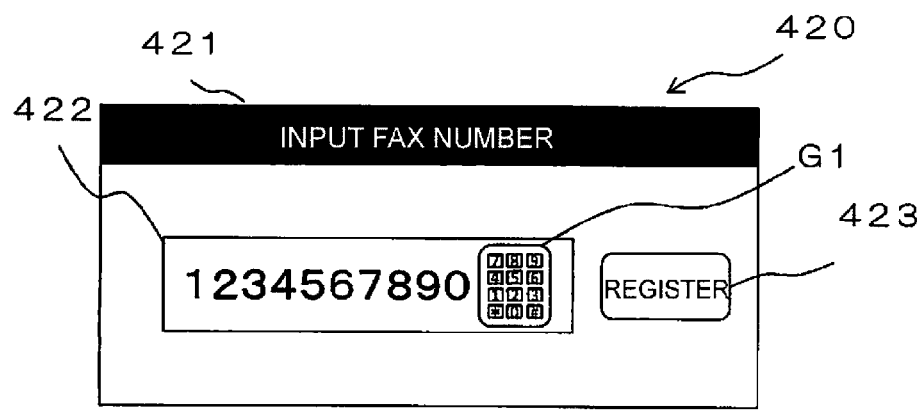
FIGS. 12A and 12B are explanatory views illustrating an example of the transition of a FAX number input window to be displayed on an MFP according to a second embodiment.

FIG. 12A illustrates a state in which operation key icon G1 is displayed in text box 422 in FAX number input window 420. Meanwhile, FIG. 12B illustrates a state in which the display of operation key icon G1 is interrupted (erased) by input guide processing unit 311 as the characters inputted in text box 422 reach the position of operation key icon G1.

Figure 12B:
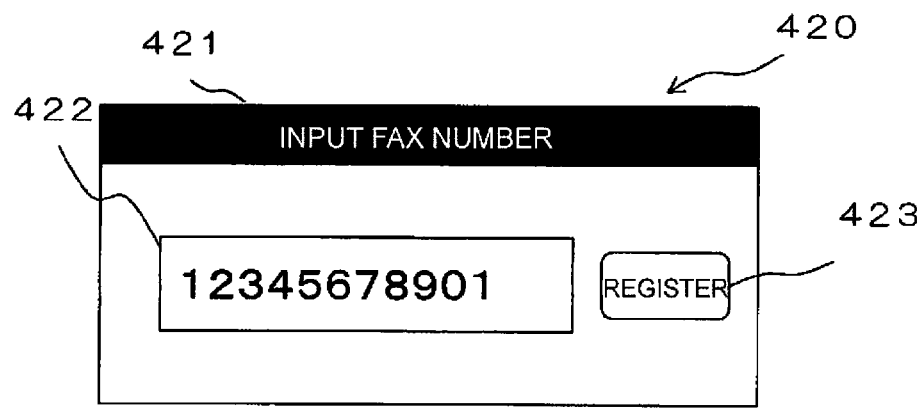

Note that even after input guide processing unit 311 interrupts the display of operation key icon G1 as illustrated in FIG. 12B, operation input processing unit 110 can continue the reception of the character input by using the hard keys (numerical keypad 202a).

Here, after input guide processing unit 311 interrupts the display of operation key icon G1 as illustrated in FIG. 12B, input guide processing unit 311 may display operation key icon G1 again when the number of characters inputted in text box 422 is reduced by a deleting operation or the like.

Figure 13:
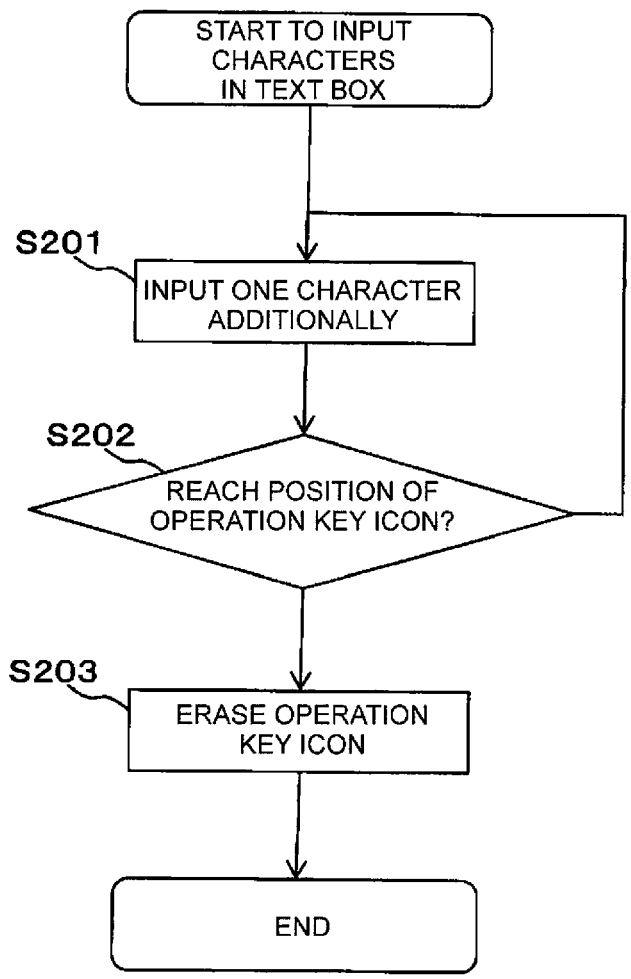
FIG. 13 is a flowchart illustrating actions of an input guide processing unit of the MFP according to the second embodiment.

The above-described actions of input guide processing unit 311 illustrated in FIGS. 12A and 12B are depicted in a flowchart in FIG. 13.

Input guide processing unit 311 of the second embodiment performs the processing in accordance with the flowchart in FIG. 13 when the characters are inputted in the text box that displays operation key icon G1. In the following, descriptions are provided for the processing by input guide processing unit 311 when the characters are inputted in text box 422 of FAX number input window 420 as illustrated in the above-described FIGS. 12A and 12B, for example. Here, as an initial state, the input of the characters in text box 422 is assumed to be started in the state in which operation key icon G1 is displayed in text box 422 in FAX number input window 420 as illustrated in FIG. 12A.

Then, when one character is additionally inputted in text box 422 (S201), input guide processing unit 311 determines whether or not the characters inputted in text box 422 reach the position of operation key icon G1 (S202).

Thereafter, when it is determined in step S202 mentioned above that the characters inputted in text box 422 reach the position of operation key icon G1, input guide processing unit 311 erases operation key icon G1 displayed in text box 422 and then terminates the processing. On the other hand, when it is determined in step S202 mentioned above that the characters inputted in text box 422 do not reach the position of operation key icon G1, input guide processing unit 311 returns to the above-mentioned step S201 and performs the processing for inputting the next character in text box 422.

It should be noted that when the input of the characters in FAX number input window 420 is completed, input guide processing unit 311 also terminates the processing in accordance with the flowchart in FIG. 13 described above.

A method used by input guide processing unit 311 for determining whether or not the characters inputted in text box 422 reach the position of operation key icon G1 is not particularly limited. Nonetheless, an example of such a method is described with reference to FIG. 10.

FIG. 10 indicates a width from a left end of text box 422 to a right end of the inputted characters as W3. Meanwhile, FIG. 10 indicates a width from a right end of text box 422 to a left end of operation key icon G1 as W2. Accordingly, input guide processing unit 311 determines that the characters inputted in text box 422 reach the position of operation key icon G1 at the point where W1−W3<W2 is met, and hence performs the processing for erasing operation key icon G1. Instead, input guide processing unit 311 may preset a predetermined number N of characters for each text box, and perform the processing for erasing operation key icon G1 when the number of characters inputted in the text box reaches the number N.

(B-3) Effect of Second Embodiment

The second embodiment can achieve the following effect.

In MFP 100 of the second embodiment, input guide processing unit 311 displays operation key icon G1 once in the text box and then erases displayed operation key icon G1 in accordance with the length (the width) of the character string inputted in the text box. Thus, it is possible to prevent the display of the inputted character string from being superposed onto operation key icon G1 inside the text box. Accordingly, MFP 100 of the second embodiment can suppress reduction in convenience for the user that may be caused by displaying operation key icon G1 in the text box. Here, when the character string inputted in the text box reaches the position of operation key icon G1, the user is supposed to have completed the input of a certain number of characters already. At that point, there is only a limited effect left for notifying the user that the input using the hard keys (numerical keypad 202a) is receivable byway of displaying operation key icon G1 anew.

(C) Other Embodiments

The invention is not limited to the above-described embodiments. The invention may also be embodied in other modified forms as described in the following examples.

(C-1)

While the embodiments describe the examples of applying the data processing apparatus of the invention to the image processing apparatus (the MFP), the invention is also applicable to other apparatuses which allow inputs of character strings using text boxes and the like, and include hard keys (such as information processing apparatuses (data processing apparatuses) including printers, FAX machines, PCs, cellular telephone terminals, smartphones, and the like).

(C-2)

In the above-described embodiments, MFP 100 includes numerical keypad 202a as the hard keys. Here, MFP 100 may mount a keyboard also including alphabet keys.

Meanwhile, in the above-described embodiments, MFP 100 includes touch panel unit 203. Instead, MFP 100 may include the character input window and the soft keys (the software keyboard) by using devices which are capable of coping with GUI operations simply using a display unit, a mouse, and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A data processing apparatus comprising: an operation screen processor configured to display an operation screen on a screen of a display output device;
   a hard key input unit capable of receiving a character input using a hard key;
   a character input object processor configured to display a character input object on the screen of the display output device, the character input object allowing an input of a character string therein;
   a soft key processor configured to display a soft key on the screen of the display output device, and capable of receiving a character input in the character input object; and
   a hard key acceptability image display unit configured, when the character input object displayed by the character input object processor can accept a first type of input using the hard key, to display a hard key acceptability image in a display area for characters to be inputted within the character input object, the hard key acceptability image indicating that the character input object accepts the first type of input using the hard key, wherein the hard key acceptability image display unit is configured, when the character input object displayed by the character input object processor can accept a second type, using soft key only, of input different from the first type of input, not to display the hard key acceptability image in the display area.

2. The data processing apparatus according to claim 1, wherein when the character string displayed in the display area for the characters reaches a position of the hard key acceptability image, the hard key acceptability image display unit interrupts the display of the hard key acceptability image in the display area for the characters to be inputted.

3. The data processing apparatus according to claim 2, wherein the character input object processor does not interrupt reception of the input in the character input object using the hard key input unit even when the character input object displaying the hard key acceptability image interrupts the display of the hard key acceptability image by the hard key acceptability image display unit.

4. A data processing apparatus comprising:
   a hard key;
   a display; and
   a display control unit that displays on the display a soft key and an entry field, wherein the display control unit displays a hard key acceptability image in the entry field when an input with the hard key to the entry field and an input with the soft key to the entry field are both allowed, but does not display the hard key acceptability image in the entry field when the soft key input to the entry field is allowed and the hard key input to the entry field is not allowed,
   wherein the display control unit displays the hard key acceptability image in the entry field for a first type of input that can be made via the hard key, and
   wherein the display control unit does not display the hard key acceptability image in the entry field for a second type of input that cannot be made via the hard key,
   the second type of input being different from the first type of input.

5. The data processing apparatus according to claim 4, wherein
   the hard key comprises a ten key.

6. The data processing apparatus according to claim 4, wherein
   the display control unit stops displaying the displayed hard key acceptability image in the entry field, when the amount of input in the entry field reaches a predetermined amount.

7. The data processing apparatus according to claim 4, further comprising
   a FAX unit, wherein
   the entry field comprises a FAX number input field.

8. The data processing apparatus according to claim 1, wherein the hard key acceptability image is displayed in an entry field in the display area, the entry field being a field that accepts user-entered input.

9. The data processing apparatus according to claim 8, wherein, when the hard key acceptability image is displayed in the entry field, both an input with the hard key to the entry field and an input with the soft key to the entry field are allowed.

10. The data processing apparatus according to claim 8, wherein a size of the hard key acceptability image is selected based on a size of the entry field.

11. The data processing apparatus according to claim 8, wherein a size of the hard key acceptability image is displayed at a largest size that can be displayed in the entry field.

12. The data processing apparatus according to claim 1, wherein a determination is made by the hard key acceptability image display unit as to whether or not the hard key acceptability image is to be displayed in the display area based on types of character strings to be inputted to the display area.

13. The data processing apparatus according to claim 1, wherein the first type of input corresponds to an input of a fax number, and wherein the second type of input corresponds to an input of an email address.

14. The data processing apparatus according to claim 4, wherein a size of the hard key acceptability image is selected based on a size of the entry field.

15. The data processing apparatus according to claim 4, wherein a size of the hard key acceptability image is displayed at a largest size that can be displayed in the entry field.

16. The data processing apparatus according to claim 4, wherein a determination is made by the hard key acceptability image display unit as to whether or not the hard key acceptability image is to be displayed in the display area based on types of character strings to be inputted to the display area.

17. The data processing apparatus according to claim 4, wherein the first type of input corresponds to an input of a fax number, and wherein the second type of input corresponds to an input of an email address.

18. The data processing apparatus according to claim 1, wherein
   wherein, when the hard key acceptability image is displayed in the display area, the user is capable of entering in a first portion of the character input using the hard key and entering in a second portion of the character input using the soft key.

19. The data processing apparatus according to claim 4, wherein wherein, when the hard key acceptability image is displayed in the display area, the user is capable of entering in a first portion of the character input using the hard key and entering in a second portion of the character input using the soft key.

\* \* \* \* \*